United States Patent [19]

Bryhn

[11] 4,425,167

[45] Jan. 10, 1984

[54] STABILIZING CLAY SOIL WITH A MIXTURE OF HYDROXY-ALUMINUM AND BASE

[75] Inventor: Odd R. Bryhn, Oslo, Norway

[73] Assignee: Chevron Research Company, San Francisco, Calif.

[21] Appl. No.: 438,235

[22] Filed: Nov. 1, 1982

[51] Int. Cl.³ .................. C04B 33/13; C09K 3/00; C09K 17/00
[52] U.S. Cl. .................. 106/287.17; 106/900; 166/292; 405/263; 405/264; 501/147
[58] Field of Search ............... 166/303, 294; 106/900, 106/287.17; 501/147; 405/263, 264

[56] References Cited

U.S. PATENT DOCUMENTS 3,793,841  2/1974  Dozsa .................. 106/900
4,372,786  2/1983  Reed et al. .......... 106/900
4,377,419  3/1983  Reed .................... 106/900

FOREIGN PATENT DOCUMENTS 55-152886  4/1980  Japan .................. 106/900

Primary Examiner—Theodore Morris
Attorney, Agent, or Firm—Edward J. Keeling; D. A. Newell

[57] ABSTRACT

The present invention provides a method of stabilizing clay soil by mixing an effective amount of dry hydroxy-aluminum and dry base with the clay.

4 Claims, 2 Drawing Figures

STABILIZATION OF QUICK CLAY BY
HYDROXY-ALUMINIUM PLUS ADDITIVES

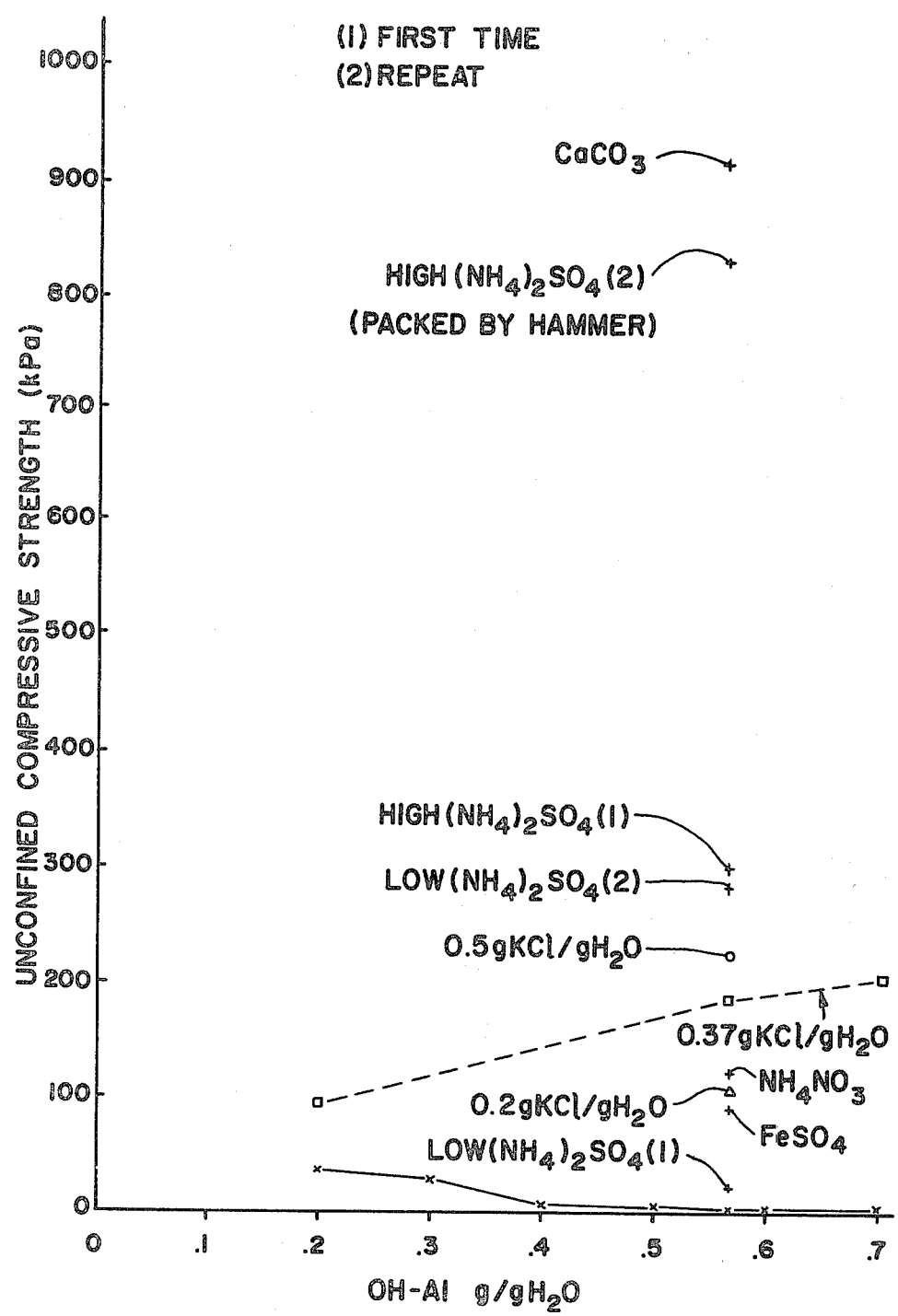
FIG_1 STABILIZATION OF QUICK CLAY BY HYDROXY-ALUMINIUM PLUS ADDITIVES

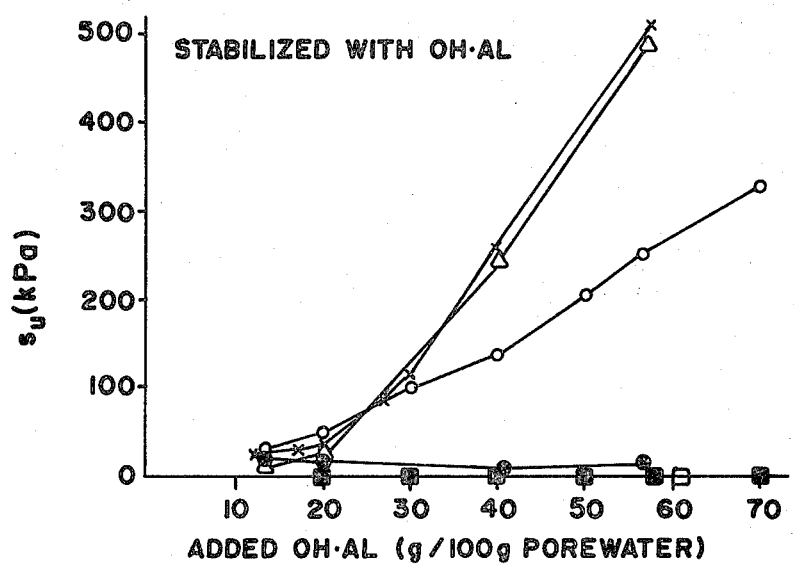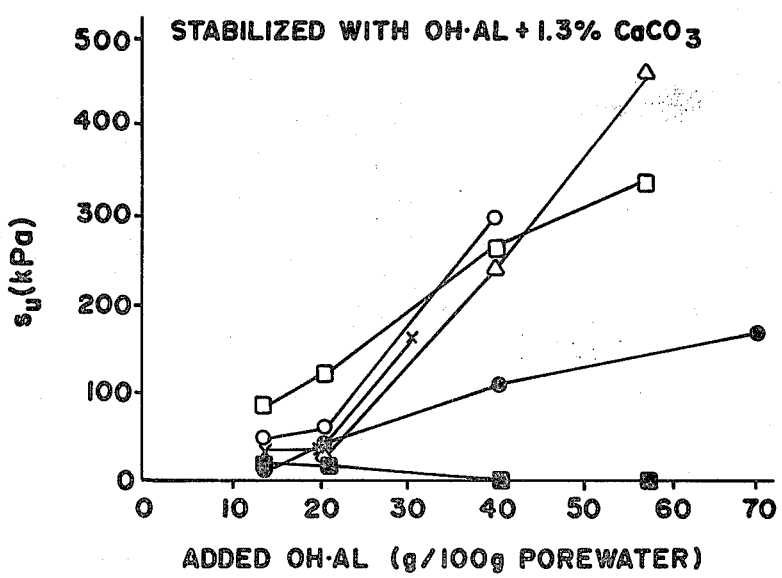
FIG_2

STABILIZING CLAY SOIL WITH A MIXTURE OF HYDROXY-ALUMINUM AND BASE

RELATED APPLICATIONS

This application is related to U.S. applications Ser. No. 281,799, by Marion G. Reed et al; Ser. No. 281,750, by Marion G. Reed; Ser. No. 281,751, by Tor Loken et al; and Ser. No. 281,752 by Tor Loken et al; all filed on July 9, 1981 all assigned to the assignee of this invention. Other applications related to this application are Ser. No. 438,545 and Ser. No. 438,234 filed concurrently herewith and also assigned to said assignee. The disclosures of these applications are incorporated herein by reference.

BACKGROUND OF THE INVENTION

Many clay deposits often need to be stabilized before they can carry any additional load such as is applied during construction activities. This is specially true for the so-called quick clays which frequently are found, for example, in northern Soviet Union, Scandinavia, Canada, upper New York State, and New Zealand. Clays were originally deposited in marine and brackish water in a short period after the last glaciation, and later during the continental (isostatic) uplift were raised above sea level. However, only certain of these clay deposits were subsequently changed into sensitive quick clays. Two processes are mainly responsible for such a change. The original pore water salt content of the clay may have been leached by percolating ground water, or organic matter from logs or marshes which will act as dispersing agents may have been introduced into the clay. The first process has been most important in clays found in Norway, while quick clays containing high organic content formed by the second process are frequently found in Sweden and Canada.

The quick clays will in the undisturbed state exhibit a certain limited strength, but will upon remoulding completely liquefy. The same phenomena has caused several quick clay slides in the lowlands of eastern and middle Norway, often with catastrophic consequences. Heretofore, several chemical stabilization schemes have been tried for such clays. Among them were aluminum chloride ($AlCl_3$) and potassium chloride (KCl). The quick clays have been stabilized in two ways. The clay can be mixed and remoulded with the chemicals, or the chemicals can be allowed to diffuse into the undisturbed quick clay. The disadvantage of the salt diffusion method is the long time it takes to reach the required penetration. The diffusion method has been applied only once, so far as is known, in full scale in the field, when salt wells containing KCl were installed two years prior to a major highway construction.

Heretofore, a method for deep stabilization with unslacked lime (CaO) was developed. Lime is an old stabilizing agent that has been used occasionally. In China it was used centuries ago as a construction material. In the United States in the 1940's and Europe in the 1950's lime was used as a surface stabilizing agent. The deep stabilization method involves mixing and molding the lime with the clay to form a series of piles which extend down into the clay. These piles provide lateral stabilization to the clay deposit.

Both the lime and potassium chloride methods have some disadvantages. KCl will stabilize the undisturbed circumjacent clay, but not the disturbed clay. Furthermore, CaO makes an unhomogenous stabilization. Pockets of lime cause brittle cylinders with small sideways shear strength. In addition, CaO is not useful on clays with high water content. While hydroxy-aluminum as $Al(OH)_{2.5}Cl_{0.5}$ has not been used as a clay stabilizing agent in foundation engineering before it has been applied as a cementing agent in preparing desired clay microstructures for laboratory studies. Hydroxy-aluminum solution containing KCl has also been used in wells to treat water sensitive clay containing formations and to provide sand stabilization. Relatively dilute solutions and overflushes are commonly used in the field. These methods are disclosed in U.S. Pat. No. 3,603,399 issued Sept. 7, 1971 and U.S. Pat. No. 3,827,495 issued Aug. 6, 1974 both to Marion G. Reed as assignor to Chevron Research Company.

The cited Related Applications provide for stabilizing clay soil by admixing an effective amount of hydroxy-aluminum and in some cases additional chemicals such as potassium chloride with the clay. While potassium chloride is preferred, other chemicals useful in place of potassium chloride include potassium nitrate, potassium sulfate, ammonium chloride, ammonium nitrate and ammonium suflate. The admixture is preferably done in a manner so that the stabilized clay forms a series of piles which extend into the clay deposit at spaced apart location to provide stability for the entire clay containing deposit. The desired size, location and number of the piles are determined. An effective amount of hydroxy-aluminum is admixed with the clay in place in each location in the deposit to react with the clay and thereby form the desired piles.

It has been found that the addition of other material can improve the method described above.

BRIEF DESCRIPTION OF THE PREFERRED EMBODIMENT OF THE INVENTION

The present invention provides a method of stabilizing clay soil by mixing with the clay soil hydroxy-aluminum having an effective amount of base mixed therewith. The carbonates and bicarbonates are useful in accordance with the invention and particularly calcium carbonate and calcium bicarbonate and mixtures thereof. The most highly preferred base for use with hydroxy-aluminum in accordance with the invention is calcium carbonate.

OBJECTS OF THE INVENTION

It is a particular object of the present invention to provide a method of stabilizing quick clay by admixing with the quick clay a mixture preferably containing hydroxy-aluminum and an effective amount of base to react with the clay. Additional objects and advantages of the present invention will become apparent from reading the following detailed description in view of the accompanying drawings.

BRIEF DESCRIPTION OF THE DRAWINGS

FIG. 1 is a graph illustrating the effect of treating clay with hydroxy-aluminum containing a base in accordance with the invention; and FIG. 2 is a graph illustrating a comparison of hydroxy-aluminum alone vs. hydroxy-aluminum plus a base.

DETAILED DESCRIPTION OF THE INVENTION

The present invention is directed to stabilizing clay soil by admixing with at least portions of such soil an effective amount of a dry mixture of chemicals including hydroxy-aluminum and base. The base may desirably be selected from the group consisting of carbonates and bicarbonates. Calcium carbonate and calcium bicarbonate are preferred bases useful in accordance with the present invention for mixture with the hydroxy-aluminum.

In preferred form a plurality of pile-like deposits are formed in situ in the clay soil deposit by admixing with wet clay a dry mixture containing at least 5% by weight of hydroxy-aluminum and an effective amount base by weight of the pore water contained in the clay soil. Best results appear to be obtained when the dry mixture chemicals contain between 5% by weight to 70% by weight of dry hydroxy-aluminum and between 1% by weight and 5% by weight of base of the pore water contained in the clay. For different clays the optimum concentration of hydroxy-aluminum and base may, of course, vary. Optimum concentration for a given clay may be determined by simple laboratory tests as herein described.

Hydroxy-aluminum, useful in accordance with the present invention, has a hydroxyl to aluminum ratio of at least 2.0. At low pressure, hydroxyl to aluminum ratios of less than 2.2 tend to be so acidic that carbonates contained in the clay soil turn to carbon dioxide which causes bubbles that are undesired in the present invention. Therefore, in carbonate containing soils it is preferred to use hydroxy-aluminum having a hydroxyl to aluminum ratio of 2.5.

Thus, hydroxy-aluminum, useful in the present invention, has the general formula $Al(OH)_n X_{3-n}$ wherein n has a value of at least 2.0 and preferably 2.5 to 2.7 and x is an anion selected from the group consisting of chloride, bromide, iodide, nitrate, sulfate and acetate. For example, dry hydroxy-aluminum chloride having a formula of $Al(OH)_{2.5} Cl_{0.5}$ has been used successfully in laboratory demonstrations of the present invention. Hydroxy-aluminum is a commercially available chemical and can be obtained for example from Reheis Chemical Company of Berkeley Heights, N.J. or Hoechst Aktiengesellschaft, Frankfurt am Main, West Germany.

"Dry" hydroxy-aluminum refers to the dry chemical with no bulk water added. Dry hydroxy-aluminum has, of course, a substantial amount of chemically bound water. One Reheis product contains, for example, about 20½ weight percent chemically bound water.

FIG. 1 is a legend showing a quick clay which was used in demonstrations conducted in accordance with the present invention. Hydroxy-aluminum and various chemicals were admixed with the quick clay and the results are shown in FIG. 1.

As illustrated graphically in FIG. 1 hydroxy-aluminum-containing calcium carbonate ($CaCO_3$) was very effective in improving the compressive strength of the quick clay. None of the other additives to the hydroxy-aluminum came close to the result achieved with hydroxy-aluminum plus calcium carbonate. The particular clay used in the demonstrations shown in FIG. 1 was Hönefoss. Hönefoss clay does not contain much calcium carbonate naturally while many other quick clays do. The concentration of hydroxy-aluminum in the effective demonstration was 0.57 gram per gram of water and the calcium carbonate concentration was equivalent to 0.37 gram per gram KCl. The results are shown in Table 1.

FIG. 2 shows a comparison of hydroxy-aluminum alone vs. hydroxy aluminum plus a base. In this case the base was 1.3% calcium carbonate.

TABLE 1

| OH—Al (g/g $H_2O$) | Additive (g/g $H_2O$) | Duration (days) | Unconfined Compressive Strength (kPa) | Nature of failure |
|---|---|---|---|---|
| 0.2 | 0 | 7 | 40.0 (cone) | |
| 0.3 | 0 | 7 | 31.0 (cone) | |
| 0.4 | 0 | 7 | 5.3 (cone) | |
| 0.5 | 0 | 7 | 4.0 (cone) | |
| 0.57 | 0 | 7 | 3.7 (cone) | |
| 0.6 | 0 | 7 | 2.1 (cone) | |
| 0.7 | 0 | 7 | 3.0 (cone) | |
| 0.2 | 0.37 KCl | 7 | 95 | plastic |
| 0.57 | 0.2 KCl | 7 | 110 | plastic |
| 0.57 | 0.37 KCl | 7 | 185 | plastic |
| 0.57 | 0.5 KCl | 7 | 200 | plastic |
| 0.7 | 0.37 KCl | 7 | 205 | plastic |
| 0.57 | high $(NH_4)_2SO_4$ (equiv. to 0.37 KCl) | 7 | 295 | brittle |
| 0.57 | low $(NH_4)_2SO_4$ (equiv. to 0.1 KCl) | 7 | 20 | plastic |
| 0.57 | high $(NH_4)_2SO_4$ (packed by hammer) | 7 | 830 | brittle |
| 0.57 | low $(NH_4)_2SO_4$ (packed by hammer) | 7 | 270 | brittle |
| 0.57 | $NH_4NO_3$ (equiv. to 0.37 KCl) | 7 | 120 | plastic |
| 0.57 | $FeSO_4$ (equiv. to 0.37 KCl) | 7 | 90 | brittle? |
| 0.57 | $CaCO_3$ (equiv. to 0.37 KCl) | 7 | 915 | brittle |

Thus the present invention provides a method of stabilizing quick clay soil by mixing hydroxy-aluminum containing an effective amount of base with the clay. The base is selected from the group consisting of carbonates and bicarbonates and preferably is either calcium carbonate and calcium bicarbonate. Calcium carbonate is the preferred base.

One of the mechanisms by which OH-Al stabilizes quick clays is the gellation of water. Gellation requires that the OH-Al polymerize to form larger inorganic structures. This polymerization in turn requires hydroxide groups may be supplied by the natural bases in the clay deposit. In accordance with the invention solid base is mixed with the solid OH-Al during application of the treatment. The reaction can be written empirically as follows:

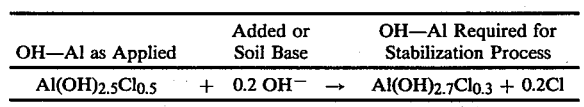

| OH—Al as Applied | Added or Soil Base | OH—Al Required for Stabilization Process |
|---|---|---|
| $Al(OH)_{2.5}Cl_{0.5}$ + | 0.2 OH$^-$ → | $Al(OH)_{2.7}Cl_{0.3}$ + 0.2Cl |

Solid forms of the chemicals must be used when base is added to the OH-Al during application because the reaction must be retarded until they are in contact with the water to be gelled.

In those quick clays that contain natural bases such as carbonates, there may be enough natural base to satisfy the total requirement. In other cases, all or part of the requirement must be met by adding a solid form of base with the OH-Al. To make these judgements, one must determine the ntaural base content of the quick clay. A procedure is as follows:

Determination of Natural Base Content of Soils (1) Weight out 20 grams of overdry soil (110° C. for 48 hours) or an amount of moist soil that is equivalent to 20 grams of overdry soil.

(2) Add 50 milliliters of distilled water and stir with magnetic stirrer for 30 minutes.

(3) Place calibrated pH electrode into soil-water mixture and slowly stir.

(4) Titrate the mixture slowly through pH 4.5 using 0.2 N HCl. Record volume of acid used.

(5) Calculate the natural base content as follows:

$$\frac{\text{Volume of Acid Used (ml)}}{20 \text{ gms dry soil}} \times 0.2 \text{ N} = \text{meg. base/gm dry soil}$$

(6) Example Calculation:

$$\frac{20 \text{ ml Acid Used}}{29 \text{ gms dry soil}} \times 0.2 \text{ N} = 0.2 \text{ meg. base/gm dry soil}$$

In the reaction as written, a total of 0.2 equivalents of base are needed for each mole of added Al. If we subtract from this the amount of base supplied by the soil, the remainder is that which must be added. A step-by-step procedure for making this calculation is as follows:

Determination of Amount of Added Base Needed (1) Calculate the amount (moles) of Al to be added per 100 grams of dry soil.

(2) Assume a total of 200 milli-equivalents of base are needed for each mole of Al added (as $Al(OH)_{2.5}Cl_{0.5}$) to the soil.

(3) Subtract the natural base content (determined by the previously described titration method) from this total requirement to determine the additional base required for the stabilization process.

(4) Example Calculation:
Specific Case Assumptions:
(a) Water content of soil is 0.37 gm per gram of dry soil.
(b) 0.5 gm of solid hydroxy-aluminum added per gram of pore water.
(c) Total of 200 meg. base required per mole of Al added.
(d) Natural base content of soil is 0.2 meg. per gram of dry soil.
(e) Solid $CaCO_3$ is used to make up base deficits.
(f) Solid hydroxy-aluminum is 24.9% Al.
Total Base Required:

$$\frac{0.37 \text{ gm pore water}}{\text{gm dry soil}} \times \frac{0.5 \text{ gm OH-Al}}{\text{gm pore water}} \times \frac{0.249 \text{ gm Al}}{\text{gm OH-Al}} \times$$

$$\frac{1}{27 \text{ gm Al/mole Al}} \times \frac{200 \text{ meg. base}}{\text{mole Al}} = \frac{0.34 \text{ meg. base}}{\text{gm dry soil}}$$

Natural Base Content of Soil $$\frac{0.2 \text{ meg. base}}{\text{gm dry soil}} \text{ (from titration example)}$$

Added Base ($CaCO_3$ Required):

$$\left(\frac{0.34 \text{ meg. base}}{\text{gm dry soil}} - \frac{0.2 \text{ meg. base}}{\text{gm dry soil}}\right) \frac{50 \text{ mg } CaCO_3}{\frac{\text{meg.}}{CaCO_3}} = \frac{7.0 \text{ mg } CaCO_3}{\text{gm dry soil}}$$

$$= \frac{5.1 \text{ mg } CaCO_3}{\text{gm wet soil}}$$

$$= \frac{19 \text{ mg } CaCO_3}{\text{gm pore water}}$$

From the above description it is evident that the present invention provides a method of stabilizing quick clay by admixing dry hydroxy-aluminum and base with the clay. Although only specific embodiments of the present invention have been described in detail, the invention is not limited thereto but is meant to include all embodiments coming within the scope of the appended claims.

What is claimed is:

1. In a method of stabilizing quick clay soil by mixing an effective amount of dry hydroxy-aluminum with the clay soil, the improvement comprising adding to the dry hydroxy-aluminum an effective amount of dry base prior to contacting the clay soil to form a mixture of dry hydroxy-aluminum and dry base and contacting the clay soil with said mixture to gel water contained in said quick clay wherein said base is selected from the group consisting of carbonates and bicarbonates.

2. The method of claim 1 further characterized in that the base is selected from the group consisting of calcium carbonate and calcium bicarbonate.

3. The method of claim 1 further characterized in that the base is calcium bicarbonate.

4. The method of claim 1 further characterized in that the dry mixture of chemicals contain between 5% by weight to 70% by weight of dry hydroxy-aluminum and between 1% by weight and 5% by weight of base of the pore water contained in the clay.

* * * * *